United States Patent [19]
Wilson

[11] Patent Number: 5,457,301
[45] Date of Patent: Oct. 10, 1995

[54] CAPACITOR DISCHARGE PROCESS FOR WELDING BRAIDED CABLE

[75] Inventor: Rick D. Wilson, Corvallis, Oreg.

[73] Assignee: The United States of America as represented by the Secretary of the Interior, Washington, D.C.

[21] Appl. No.: 352,752

[22] Filed: Dec. 2, 1994

[51] Int. Cl.⁶ ..................................................... B23K 9/22
[52] U.S. Cl. ........................... 219/137 PS; 219/56.22; 219/93; 219/96
[58] Field of Search ..................... 219/137 PS, 113, 219/127, 130.1, 56.1, 56.21, 56.22, 93, 95, 96; 228/138

[56] References Cited

U.S. PATENT DOCUMENTS

| | | | |
|---|---|---|---|
| 2,874,264 | 2/1959 | Quinlan | 219/95 |
| 3,325,621 | 6/1967 | Conrad | 219/95 |
| 3,402,466 | 9/1968 | Phillips | 219/56.22 |
| 3,539,762 | 11/1970 | Swengel, Sr. et al. | 219/127 |
| 3,634,649 | 1/1972 | Rager et al. | 219/137 R |
| 3,703,623 | 11/1972 | Swengel, Sr. | 219/137 R |
| 3,934,786 | 1/1976 | Kozak et al. | 228/138 |
| 4,038,743 | 8/1977 | DuRocher et al. | 219/95 |

*Primary Examiner*—Clifford C. Shaw
*Attorney, Agent, or Firm*—E. Philip Koltos

[57] ABSTRACT

A capacitor discharge process for welding a braided cable formed from a plurality of individual cable strands to a solid metallic electrically conductive member comprises the steps of: (a) preparing the electrically conductive member for welding by bevelling one of its end portions while leaving an ignition projection extending outwardly from the apex of the bevel; (b) clamping the electrically conductive member in a cathode fixture; (c) connecting the electrically conductive member clamped in the cathode fixture to a capacitor bank capable of being charged to a preselected voltage value; (d) preparing the braided cable for welding by wrapping one of its end portions with a metallic sheet to form a retaining ring operable to maintain the individual strands of the braided cable in fixed position within the retaining ring; (e) clamping the braided cable and the retaining ring as a unit in an anode fixture so that the wrapped end portion of the braided cable faces the ignition projection of the electrically conductive member; and (f) moving the cathode fixture towards the anode fixture until the ignition projection of the electrically conductive member contacts the end portion of the braided cable thereby allowing the capacitor bank to discharge through the electrically conductive member and through the braided cable and causing the electrically conductive member to be welded to the braided cable via capacitor discharge action.

11 Claims, 1 Drawing Sheet

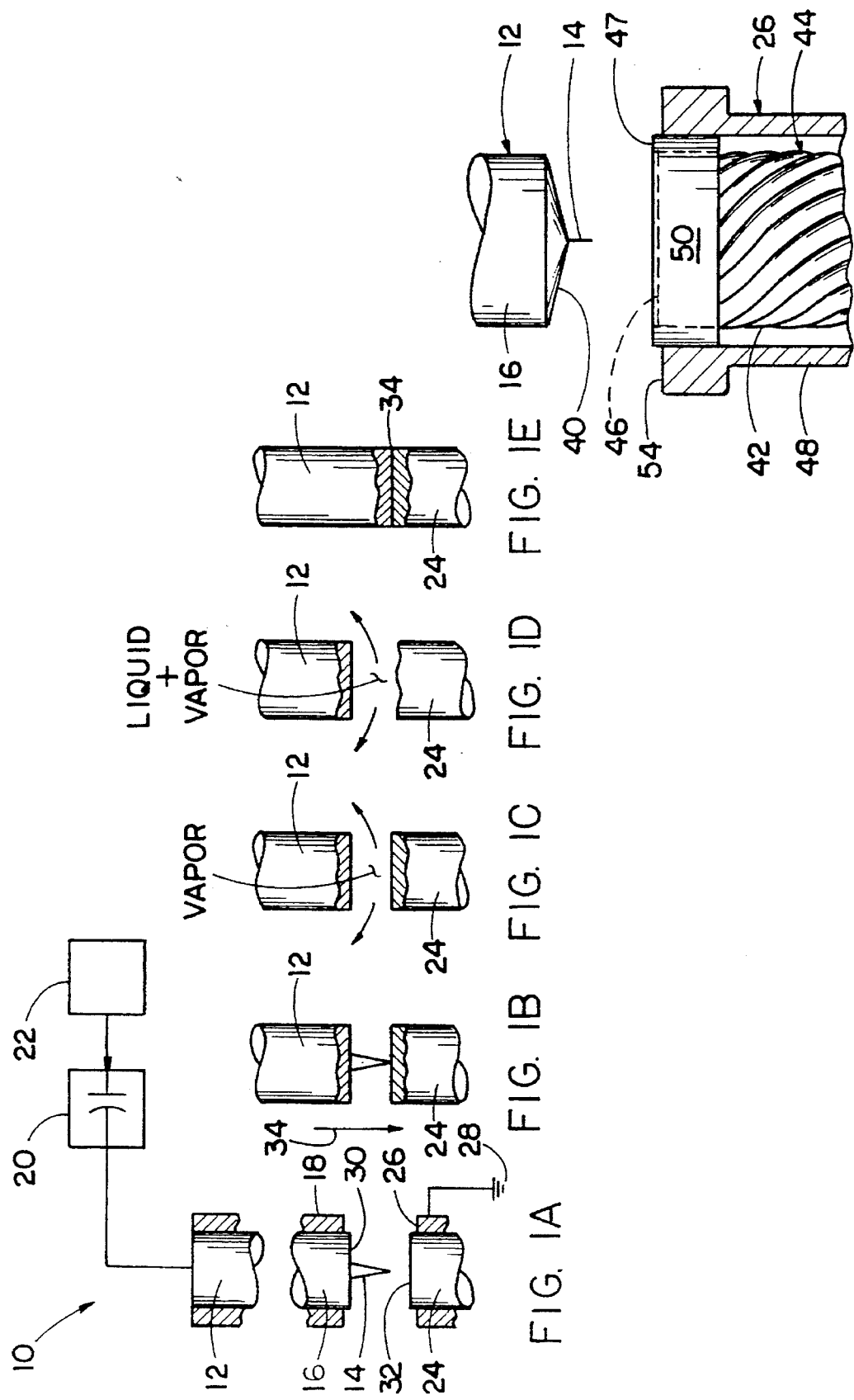

CAPACITOR DISCHARGE PROCESS FOR WELDING BRAIDED CABLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to a capacitor discharge welding process and, more particularly, to such a process adapted to join metallic braided cable to solid metallic, intermetallic or metallic composite substrates.

2. Description of the Prior Art

With the present state of the art, if it is desired to join a braided cable to an electrode, a known brazing, soldering or resistance welding process must be utilized. However, each of these processes has their shortcomings. Both the soldering and brazing processes require the use of harmful welding agents such as lead-based materials or toxic fluoride-containing fluxes. The resistance welding process has the drawback of being a high heat input process. The generation of high heat can dramatically change the microstructure of the braided cable or the electrode and sometimes weakens the base metal of the electrode adjacent the heat affected zone created during the welding process. Changes in metal microstructure or the weakening of the electrode adjacent its heat affected zone can obviously result in failures during electrode use.

As an alternative to the known brazing, soldering or resistance welding processes presently used to join braided cables to electrodes, it would be desirable to utilize a welding process which does not generate high heat during operation and which does not require the use of harmful welding agents. The capacitor discharge welding process could be such an alternative. The capacitor discharge welding process itself generally involves gravity assisted, axial impact of cylindrical specimens with subsequent arcing and melting (and thus joining) by the discharge of a capacitor bank. During impact the arc is extinguished, and any excess molten metal is expelled as solidification occurs. Attractive features of the capacitor discharge process include the suppression of fusion zone porosity due to hydrogen uptake and a minimal heat affected zone. In addition the welds tend not to crack because of the compressive forces developed during the welding cycle. Thus the microstructure near the weld is characteristic of the base metal and is affected little by the joining process. Finally, the width of the fusion zone can be controlled by varying the welding parameters, which in turn control the cooling rate.

It is apparent from the foregoing that the capacitor discharge welding process for joining braided cables to solid electrodes would be a desirable alternative to known brazing, soldering and resistance welding processes. However, the capacitor discharge welding process has not heretofore been used successfully to join a braided cable such as a copper electrical cable and a solid copper electrode such as a terminal due to the flexible nature of braided cables. Since braided cables are flexible, the individual cable strands forming the cable unwrap slightly upon cable cutting in preparation for welding. This slight unwrapping adversely affects the capacitor discharge welding process and results in the achievement of a less than satisfactory weld.

Consequently, there is a need for an improved capacitor discharge welding process which takes into account the flexible nature of braided cables and results in the formation of a metallurgically strong weld joint between the braided cable and the solid electrode after the capacitor discharge welding process is complete.

SUMMARY OF THE INVENTION

The present invention relates to a capacitor discharge process for welding a braided cable to a solid electrode designed to satisfy the aforementioned needs. The capacitor discharge welding process of the present invention allows a braided cable to be joined to solid metallic, intermetallic or metallic composite substrates and is environmentally attractive because it does not result in the toxic waste disposal problems associated with lead-based solder or the clean up of fluoride-containing welding fluxes. Finally, the implementation of the process of the present invention causes very little metallurgical damage to either the braided cable or the solid electrode resulting in the consistent formation high strength welded joints.

Accordingly, the present invention is directed to a capacitor discharge process for welding a braided cable formed from a plurality of individual strands of cable wire to a cylindrical, electrically conductive member, comprising the steps of: (a) preparing the cylindrical, electrically conductive member for welding by bevelling an end portion of the cylindrical, electrically conductive member and leaving an ignition projection extending outwardly from the apex of the bevel; (b) clamping the cylindrical, electrically conductive member in a cathode fixture; (c) connecting the cylindrical, electrically conductive member clamped in the cathode fixture to a capacitor bank capable of being charged to a preselected voltage value; (d) preparing the braided cable for welding by wrapping an end portion of the braided cable with a metallic sheet to form a retaining ring operable to maintain the individual strands of braided cable wire in fixed position within the retaining ring; (e) clamping the braided cable and the retaining ring as a unit in an anode fixture so that the wrapped end portion of the braided cable faces the ignition projection of the cylindrical, electrically conductive member; and (f) moving the cathode fixture towards the anode fixture until the ignition projection of the cylindrical, electrically conductive member held within the cathode fixture contacts the end portion of the braided cable allowing the capacitor bank to electrically discharge through the cylindrical, electrically conductive member and through the braided cable thereby welding the electrically conductive member to the braided cable via capacitor discharge action.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1A is a schematic representation of a capacitor discharge welding system prior to a welding cycle, illustrating a cylindrical, electrically conductive member representing a cathode clamped within a cathode fixture and connected with a capacitor bank, and further illustrating a cylindrical, electrically conductive member representing an anode clamped within an electrically grounded anode fixture;

FIG. 1B is a schematic representation of the first step in the capacitor discharge welding process, illustrating an ignition projection protruding from the end portion of the cylindrical, electrically conductive cathode striking the cylindrical, electrical conductive anode and discharging the capacitor bank as the cathode fixture is moved towards the anode fixture;

FIG. 1C is a schematic representation of the step in the capacitor discharge welding process immediately following the step of FIG. 1B, illustrating how the arc generated when the ignition projection of the cathode strikes the anode;

FIG. 1D is a schematic representation of the step in the capacitor discharge welding process immediately following the step of FIG. 1C, illustrating how the arc generated when the ignition projection of the cathode strikes the anode quickly spreads across the opposing faces of the cathode and anode and metal plasma streams away from the opposing faces;

FIG. 1E is a schematic representation of the last step in the capacitor discharge welding process, illustrating full contact between the cathode and anode; and FIG. 2 is a side elevational view, partially in section, of a braided cable positioned in an anode fixture according to the process of the present invention and ready for welding to a cylindrical, electrically conductive member in the form of a cathode via a capacitor discharge welding process.

DETAILED DESCRIPTION OF THE INVENTION

The present invention is directed to a capacitor discharge process for welding a braided cable such as an electrical conductor to a cylindrical, electrically conductive member such as an electrical terminating device. Typically, the electrical terminating device is used in electrical applications to connect the braided cable to an end device such as a terminal block, a motor or any other type of electrical equipment. The process of the present invention is useful since it eliminates the hazards associated with heretofore known and utilized processes for joining braided cables to terminating devices such as brazing, soldering and resistance welding processes. The capacitor discharge welding process of the present invention is a rapid solidification process that produces welds approximately 100 microns thick with the heat affected zone at the area of the weld having a width on the order of 150 microns. These characteristics of the process result in very little metallurgical damage to the base metal of both the braided cable and the cylindrical, electrically conductive member, leading to high strength joints. The process of the present invention is preferred since it is environmentally benign and does not use lead-based fillers or toxic fluoride fluxes.

Referring now to the drawings, and particularly to FIG. 1A, there is illustrated a schematic representation of a capacitor discharge welding (CDW) system and generally designated by the numeral 10. As seen in FIG. 1A, the CDW system 10 includes a cylindrical, electrically conductive member 12 having an ignition projection 14 extending from the end portion 16 of the electrically conductive member 12. The electrically conductive member 12 is effectively a cathode in the CDW system and is clamped tightly within a cathode fixture 18. The electrically conductive member 12 is connected with a capacitor bank 20 and the capacitor bank 20 is, in turn, connected with a power supply 22.

The CDW system 10 further includes a cylindrical, electrically conductive member 24. The electrically conductive member 24 is effectively an anode in the CDW system and is clamped tightly within an anode fixture 26. The anode fixture 26 is electrically connected with ground potential illustrated schematically at 28. The CDW system is operable to weld the electrically conductive member 12 to the electrically conductive member 24 at their respective facing surfaces 30, 32. FIG. 1A illustrates the initial position of the electrically conductive members 12, 24 prior to welding. As illustrated in FIG. 1A, the capacitor bank 20 is fully charged and the resistance of the series electrical circuit extending between the power supply 22 and ground potential 28 is infinite. FIG. 1B illustrates the ignition projection 14 of the electrically conductive member 12 contacting the face 32 of the electrically conductive member 24 as the cathode fixture 18 is moved in a direction towards the stationary anode fixture 26 as illustrated by the directional arrow 34. As the ignition projection 14 contacts the face 32 of the electrically conductive member 24, the capacitor bank 20 discharges through the electrically conductive member 12 and, as illustrated in FIG. 1C, the ignition projection 14 is vaporized as an arc is generated. FIG. 1D illustrates how the arc quickly spreads across the opposing faces 30, 32 and how metal plasma streams away from the opposing faces 30, 32. At this instant, the resistance of the series electrical circuit extending between the power supply 22 and ground potential 28 is approximately $2 \times 10^{-2}$ ohms. As the plasma moves away from the opposing faces 30, 32, the superheated vapor cools and condenses into spherical metal particles. The plasma and solid particles continue to move away from the weld joint in trajectories defined by the magnetic field. FIG. 1E illustrates full contact between the electrically conductive members 12 and 24. The resistance of the circuit at contact decreases to zero as the arc is extinguished and the layers of liquid metal at the opposing faces 30, 32 solidify in a homogeneous layer to form the joint 34.

The above-described CDW system 10 has been successfully utilized to weld cylindrical, electrically conductive members such as the members 12, 24 but has not heretofore been utilized successfully to join a braided cable to an electrically conductive member due to the inherent flexibility of braided cable. However, preparing the end of the braided cable to be welded as disclosed hereafter will allow the CDW process to be used extremely effectively to join a braided cable to a solid cylindrical, electrically conductive member. The preparation of the braided cable for welding via the CDW process, and the preparation of the electrically conductive member 12 to enhance the braided cable CDW welding process is illustrated in FIG. 2.

Now referring to FIG. 2, there is illustrated a side elevational view, partially in section, of the end portion 16 of the electrically conductive member 12 including the ignition projection 14. The end portion 16 of the electrically conductive member 12 is bevelled as represented by the numeral 40 to facilitate welding to a braided cable. The degree of bevel is preferably between two and four degrees, depending upon the metallurgies of the pieces to be welded. FIG. 2 further illustrates a sectional view of the anode fixture 26. As described with respect to FIG. 1A, the anode fixture 26 illustrated in FIG. 2 is connected with ground potential 28.

Positioned within the anode fixture 26 is the end portion 42 of a braided cable 44. The braided cable 44 is considered an anode electrode and is prepared for welding via the CDW process by first making a perpendicular cut across the braided cable 44 so that the face 46 of the braided cable 44 is substantially perpendicular to the side wall 48 of the anode fixture 26 when the braided cable 44 is clamped within the anode fixture 26. The end portion 42 of the braided cable 44 is wrapped with a metallic sheet 50 which forms a retaining ring for the end portion 42 of the braided cable 44. The metallic sheet 50 has a metallurgy similar to the metallurgy of the braided cable 44. For example, if the braided cable 44 is copper, then so is the metallic sheet 50. The metallic sheet 50 is preferably crimped to the end portion 42 of the braided cable 44 so that it remains in fixed position on the end portion 42. The metallic sheet 50 extending tightly around the circumference of the end portion 42 of the braided cable 44 ensures that each of the individual strands 52 forming the braided cable 44 remains in fixed position relative to every other strand in the cable and also remain in fixed position relative to the metallic sheet 50 when the end portion 42 of the braided cable 44 is clamped within the anode fixture 26 prior to initiating the CDW process. After the braided cable 44 is wrapped with the metallic sheet 50, the end portion 42 of the braided cable 44 and the metallic sheet 50 are clamped as a unit securely within the anode fixture 26, ensuring that each of the individual strands 52 remains perpendicular to the side wall 48 of the anode fixture 26 and fixed in place during the CDW cycle. The end portion 42 of the braided cable 44 should extend slightly above the metallic sheet 50 so that the face 46 may be polished prior to welding. Typically, the end portion 42 of the braided cable 44 should be polished or ground until the face 46 of the braided cable 44 is even with the face 47 of the metallic sheet 50. The face 46 of the braided cable 44 and the face 47 of the metallic sheet 50 should extend slightly above the top wall 54 of the anode fixture 26 to prevent the electrically conductive member 12 from welding itself to the anode fixture 26 during the welding cycle. After thoroughly cleaning the metallic sheet 50 and the braided cable 44 end portion 42 with preferably an ultrasonic cleaning process, the CDW process may begin.

Several examples of CDW braided cable joining were completed utilizing the process of the present invention, including welding braided copper cable to solid copper for electrical connections, braided steel cable to solid mild steel, twisted aluminum cable to 6061 aluminum, twisted aluminum cable to aluminum/silicon carbide composite, and braided steel cable to iron aluminide intermetallic. Metallographic examination of a braided steel cable to solid steel weld revealed that each strand of the braided cable was securely joined to the solid electrode. The weld was approximately 100 micrometers thick. The average tensile stress at peak load for a 2.54 mm braided copper cable was determined to be 125 MPa. The average peak stress for solid copper to braided copper CD welds was found to be 116 MPa or 93 percent of the cable strength. The heat affected zone was less than 50 microns wide and no segregation of impurities was observed along the weld centerline. This was not surprising since the cooling rate on solid to solid CD welds is on the order of $10^5$ degrees C/second. In general, cooling rates increase as the diameter of the welded cylinders decrease, therefore the cooling rate of welded stranded cable is extremely fast.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

I claim:

1. A capacitor discharge process for welding a braided cable formed from a plurality of individual cable strands to a solid metallic cylindrical, electrically conductive member, comprising the steps of:

(a) preparing said cylindrical, electrically conductive member for welding by bevelling an end portion of said cylindrical, electrically conductive member and leaving an ignition projection extending outwardly from the apex of said bevel;

(b) clamping said cylindrical, electrically conductive member in a cathode fixture;

(c) connecting said cylindrical, electrically conductive member clamped in said cathode fixture to a capacitor bank capable of being charged to a preselected voltage value;

(d) preparing said braided cable for welding by wrapping an end portion of said braided cable with a metallic sheet to form a retaining ring operable to maintain the individual strands of said braided cable in fixed position within said retaining ring;

(e) clamping said braided cable and said retaining ring as a unit in an anode fixture so that said wrapped end portion of said braided cable faces said ignition projection of said cylindrical, electrically conductive member; and (f) moving said cathode fixture towards said anode fixture until said ignition projection of said cylindrical, electrically conductive member contacts said end portion of said braided cable thereby allowing said capacitor bank to discharge through said cylindrical, electrically conductive member and through said braided cable and causing said electrically conductive member to be welded to said braided cable via capacitor discharge action.

2. The capacitor discharge process as recited in claim 1, wherein a perpendicular cut is made across said braided cable prior to preparing step (d) to ensure that the cut end of said braided cable is substantially perpendicular to a side wall of said anode fixture upon completion of said clamping step (e).

3. The capacitor discharge process as recited in claim 2, wherein:

said metallic sheet is wrapped around said end portion of said braided cable so that said cut end of said braided cable extends above said metallic sheet; and said cut end of said braided cable extending above said metallic sheet is ground away until said cut end of said braided cable is smooth and perpendicular to said side wall of said anode fixture.

4. The capacitor discharge process as recited in claim 1, wherein said braided cable and said retaining ring are ultrasonically cleaned prior to being clamped in said anode fixture.

5. The capacitor discharge process as recited in claim 1, wherein said end portion of said cylindrical, electrically conductive member has a bevelled end portion.

6. The capacitor discharge process as recited in claim 5, wherein said bevelled end portion has a 4 degree bevel.

7. The capacitor discharge process as recited in claim 1, wherein said metallic sheet and said braided cable are made from the same type of material.

8. The capacitor discharge process as recited in claim 7, wherein said metallic sheet and said braided cable are each made of copper.

9. The capacitor discharge process as recited in claim 1, wherein said cylindrical, electrically conductive member and said braided cable are each made of copper.

10. The capacitor discharge process as recited in claim 1, wherein said cylindrical, electrically conductive member and said braided cable are each made of steel.

11. The capacitor discharge process as recited in claim 1, wherein said cylindrical, electrically conductive member and said braided cable are each made of aluminum.

\* \* \* \* \*